United States Patent
Su et al.

(10) Patent No.: US 9,150,753 B2
(45) Date of Patent: Oct. 6, 2015

(54) METHOD FOR MAKING WATERBORNE POLYURETHANE WITH A REACTIVE FUNCTIONAL GROUP AND A NANOCOMPOSITE MADE OF THE SAME

(71) Applicant: Chung-Shan Institute of Science and Technology, Armaments, Bureau, Ministry of National Defense, Taoyuan County (TW)

(72) Inventors: Wen-Chiung Su, Taoyuan County (TW); Shi-Min Shau, Taoyuan County (TW); Sheng-hong Dai, Taoyuan County (TW); Ru-Jong Jeng, Taoyuan County (TW)

(73) Assignee: NATIONAL CHUNG SHAN INSTITUTE OF SCIENCE AND TECHNOLOGY, Taoyuan (TW)

( * ) Notice: Subject to any disclaimer, the term of this patent is extended or adjusted under 35 U.S.C. 154(b) by 0 days.

(21) Appl. No.: 14/449,652

(22) Filed: Aug. 1, 2014

(65) Prior Publication Data

US 2014/0343224 A1 Nov. 20, 2014

Related U.S. Application Data

(63) Continuation-in-part of application No. 13/420,511, filed on Mar. 14, 2012, now abandoned.

(30) Foreign Application Priority Data

Nov. 17, 2011 (TW) .............................. 100142061 A

(51) Int. Cl.
*C08J 3/07* (2006.01)
*C08K 3/34* (2006.01)
(Continued)

(52) U.S. Cl.
CPC .......... *C09D 175/08* (2013.01); *C08G 18/0823* (2013.01); *C08G 18/0866* (2013.01);
(Continued)

(58) Field of Classification Search
IPC ....... C08J 3/07; C08G 18/0823,18/12, 18/3215, C08G 18/348, 18/3831, 18/0866, 18/329, C08G 18/3293, 18/3829, 18/3842, 18/3846, C08G 18/3228, 18/3234, 18/4238, 18/4277, C08G 18/48, 18/4854, 18/6607, 18/6614, C08G 18/6618, 18/6622, 18/6625, 18/6629, C08G 18/664, 18/6648, 18/6651; C08K 3/346, C08K 9/04
See application file for complete search history.

(56) References Cited

U.S. PATENT DOCUMENTS 6,391,449 B1 * 5/2002 Lan et al. ....................... 428/402
7,592,387 B2 * 9/2009 Kim et al. ...................... 524/445
(Continued)

*Primary Examiner* — Rabon Sergent
(74) *Attorney, Agent, or Firm* — Jackson IPG PLLC; Demian K. Jackson

(57) ABSTRACT

A method for forming an aqueous polyurethane dispersion including providing an isocyanate (NCO)-terminated prepolymer with a side-chain reactive functional group by admixing (i) at least one diisocyanate, (ii) at least one difunctional polyol, (iii) a short-chain diol monomer having a side-chain reactive functional group or a modified clay thereof, (iv) at least one hydroxy carboxylic acid compound and (v) a hydrophilic cosolvent; neutralizing the NCO-terminated prepolymer with a tertiary amine; dispersing the NCO-terminated prepolymer in water; and admixing the NCO-terminated prepolymer with at least one chain extending agent comprising a hydrophilic diamine; wherein the short-chain diol monomer (iii) is expressed by structural formula (I):

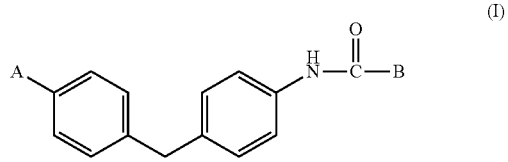

(I)

wherein, A is an azetidine-2,4-dione functional group

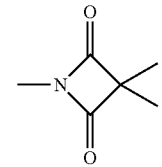

or a malonamide-linked alkyl group

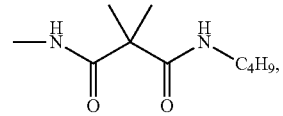

and B is a nitrogen-linked di-hydroxy terminal group

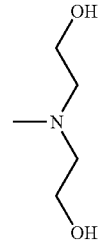

or tertiary amine-linked di-hydroxy terminal group

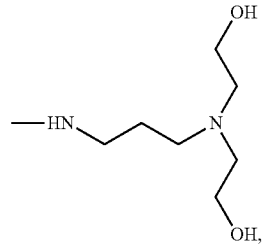

wherein IDD was synthesized by methylenedi-p-phenyl diisocyanate and isobutyryl chloride using triethylamine as catalyst.

16 Claims, 8 Drawing Sheets

(51) Int. Cl.

| | |
|---|---|
| *C08G 18/32* | (2006.01) |
| *C08G 18/38* | (2006.01) |
| *C08G 18/42* | (2006.01) |
| *C08G 18/48* | (2006.01) |
| *C08G 18/73* | (2006.01) |
| *C08G 18/75* | (2006.01) |
| *C08G 18/76* | (2006.01) |
| *C09D 175/08* | (2006.01) |
| *C08G 18/66* | (2006.01) |
| *C08G 18/12* | (2006.01) |
| *C08G 18/08* | (2006.01) |
| *C08G 18/72* | (2006.01) |
| *C08G 18/80* | (2006.01) |
| *C08G 18/10* | (2006.01) |
| *C08G 18/34* | (2006.01) |
| *C08K 9/04* | (2006.01) |

(52) U.S. Cl.
CPC ............ *C08G18/10* (2013.01); *C08G 18/12* (2013.01); *C08G 18/329* (2013.01); *C08G 18/3215* (2013.01); *C08G 18/3228* (2013.01); *C08G 18/3234* (2013.01); *C08G 18/3293* (2013.01); *C08G 18/348* (2013.01); *C08G 18/3829* (2013.01); *C08G 18/3842* (2013.01); *C08G 18/3846* (2013.01); *C08G 18/4238* (2013.01); *C08G 18/4277* (2013.01); *C08G 18/48* (2013.01); *C08G 18/4854* (2013.01); *C08G 18/664* (2013.01); *C08G 18/6607* (2013.01); *C08G 18/6614* (2013.01); *C08G 18/6618* (2013.01); *C08G 18/6622* (2013.01); *C08G 18/6625* (2013.01); *C08G 18/6629* (2013.01); *C08G 18/6648* (2013.01); *C08G 18/6651* (2013.01); *C08G 18/6655* (2013.01); *C08G 18/6659* (2013.01); *C08G 18/6662* (2013.01); *C08G 18/6674* (2013.01); *C08G 18/6681* (2013.01); *C08G 18/6685* (2013.01); *C08G 18/6688* (2013.01); *C08G 18/6692* (2013.01); *C08G 18/6696* (2013.01); *C08G 18/724* (2013.01); *C08G 18/73* (2013.01); *C08G 18/755* (2013.01); *C08G 18/758* (2013.01); *C08G 18/76* (2013.01); *C08G 18/7621* (2013.01); *C08G 18/7664* (2013.01); *C08G 18/7671* (2013.01); *C08G 18/8041* (2013.01); *C08J 3/07* (2013.01); *C08K 3/346* (2013.01); *C08K 9/04* (2013.01)

(56) References Cited

U.S. PATENT DOCUMENTS

| | | | |
|---|---|---|---|
| 8,318,889 B2 * | 11/2012 | Su et al. | 528/78 |
| 2002/0022678 A1 * | 2/2002 | Lan et al. | 523/202 |

\* cited by examiner

* equivalent ratio : azetidine-2,4-dione to Jeffamine

METHOD FOR MAKING WATERBORNE POLYURETHANE WITH A REACTIVE FUNCTIONAL GROUP AND A NANOCOMPOSITE MADE OF THE SAME

CROSS-REFERENCE TO RELATED APPLICATIONS

This application claims priority to U.S. patent application Ser. No. 13/420,511, filed Mar. 14, 2012, the disclosure of which is incorporated by reference in its entirety.

BACKGROUND OF INVENTION

1. Field of Invention

The present invention relates to waterborne polyurethane with a reactive functional group and a nanocomposite based on the waterborne polyurethane and, more particularly, to waterborne polyurethane with a reactive side-chain group and clay based on the waterborne polyurethane and, more particularly, to waterborne polyurethane added with a small molecular monomer with a reactive functional group to increase the molecular weight and enhance the physical strength, the chemical resistance, the mechanical strength, the hydrolysis resistance, the thermo-tolerance and wear resistance.

2. Related Prior Art

Waterborne polyurethane has been developed for about 60 years and commercialized for more than 30 years. Conventionally, to make waterborne polyurethane, polyol and a hydrophilic functional alcohol (or amine) monomer are pre-polymerized in a small amount of hydrophilic solvent and an excessive amount of di-isocyanate, and neutralized by an ionized compound. The hydrophilic solvent may be N-methyl pyrrolidone ("NMP"), methyl ethyl ketone ("MEK") or acetone. The ionized compound may be carboxylic group/tertiary amine or sodium salt. Thus, the pre-polymer of the polyurethane is ionized. As a molecular chain grows to a certain length, the activity of the terminal isocyanate is considerably reduced. Hydrophilic amine can be used to extend the molecular chain and then enlarge the molecular weight, thus producing waterborne polyurethane dispersion.

Early patents related to waterborne polyurethane are mostly focused on processes for making waterborne polyurethane. Recent patents related to waterborne polyurethane are mostly focused on improvement of the physical properties of waterborne polyurethane and applications of waterborne polyurethane. In Taiwanese Patent Nos. 293962 and 262197, waterborne polyurethane dispersion is disclosed for coating, adhering and gluing glass fibers. in Taiwanese Patent No. 228515, polyurethane, polyurethane-polyurea or polyurea dispersion that is self-crosslink at high temperature is used as paste for glass fibers so that the finished glass fibers exhibit improved processability and that plastics enhanced by the glass fibers exhibit improved mechanical properties. In Taiwanese Patent No. 191177, a di-isocyanate uretedione derivative is disclosed for use in waterborne polyurethane. The di-isocyanate uretedione derivative is made by addition aziridine in di-isocyanate uretedione.

The physical properties of waterborne polyurethane can be enhanced by a reactive design. For example, disclosed in Taiwanese Patent No. 225495 is polyurethane dispersion of reactive or post-crosslink polyurethane. In Taiwanese Patent No. 197134, there is disclosed waterborne polyurethane lotion and a related coating. Moreover, waterborne polyurethane dispersion derived from blocked aromatic diisocyanate has been disclosed in papers such as U.S. Pat. No. 4,387,181 and Progress in Organic Coatings, 48, 2003, 71-79.

In Taiwanese Patent No. 176144, disclosed waterborne polyurethane dispersion. When the temperature reaches a certain degree, isocyanate will be produced and reacts with any substance that contains the hydroxyl group. Such blocked waterborne polyurethane can be used in textile and on wood, paper and plastics.

However, to effectively emulsify and disperse the pre-polymer in water, a practical product must include aliphatic or cycloaliphatic di-isocyanate that is lowly water-reactive such as di-isocyanate ("IPDI"), hexamethylene diisocyanate ("HDI") and bis(cyclohexyl)methylene diisocyanate ("$H_{12}$MDI"). These compounds are expensive, and their physical properties are no match of solvent-type counterparts because of the structure of aliphatic compounds.

However, many organic solvents are used currently such as toluene and dimethylformamide ("DMF"). These compounds pollute the environment and impose hazard to human health. As the environmental protection is getting more attention worldwide and laws and rules are getting tougher against environmental pollution, there is a growing need for low-pollutant and high-performance waterborne resin.

To solve the foregoing problems, conventionally, aliphatic or cycloaliphatic di-isocyanate is used at the ends of polyurethane pre-polymer to suppress reaction of the functional group ("NCO") with water in dispersion and therefore slow down the reduction of the NCO and avoid failure of dispersion. Related techniques can be found in U.S. Pat. Nos. 7,193,011, 5,714,561, 5,852,105 and 5,905,113, U.S. Patent Application Publication No. 2009/0192283 A1, and European Patent Nos. 738,750 and 682,049.

In Journal of Polymer Science: Part A: Polymer Chemistry, 2004, 42, 4353-4369, disclosed waterborne polyurethane as methylene di-p-phenyl diisocyanate ("MDI")/IPDI mixture. The intermolecular forces and physical properties in relation to different concentrations of MDI have been discussed.

Disclosed in U.S. Patent Application Publication Nos. 2003/0027923 A1 and 2005/0020707 A1 is high-performance waterborne polyurethane. Reaction of the functional group ("NCO") of the aliphatic or cycloaliphatic di-isocyanate with water in dispersion suppress and therefore slow down the reduction of the NCO and avoid failure of dispersion. In the dispersion of prepolymer with aromatic isocyanate as a terminal group, reaction of the functional group of isocyanate with water is suppressed and the molecular chain is effectively extended. Toluene diisocyanate ("TDI") is used as an initiator without having to use any aliphatic or cycloaliphatic di-isocyanate. By strict control over the concentration of the functional group of NCO in the prepolymerization and the concentration of a chain-extending agent, waterborne polyurethane dispersion is made with excellent physical properties and stability in storage.

Except addition of a curing agent and changing the properties of the components, waterborne polyurethane nanocomposites have been widely studied, e.g., Macromolecules, 2006, 39, 6133 and Journal of Polymer Science: Part A: Polymer Chemistry, 2006, 44, 5801. Clay is lamination of silicate layers and an abundant, inexpensive inorganic material in the nature. Clay exhibits advantages such as excellent mechanical properties, thermo-tolerance, chemical resistance and a low expansion coefficient, and therefore is often used as an enhancing material for polymers. However, unmodified clay is hydrophilic and poorly compatible with polymers that are hydrophobic, and the silicate layers tend to be aggregated and cannot be evenly distributed. However, the clay is hydrophilic in nature and lacks the affinity for hydrophobic organic polymers. To improve its miscibility with polymers, the clay must be modified to become organophilic by widening the interlayer spacing with surfactants. In 1987, Toyota released a nanometer dispersed clay/nylon nanocomposite the first time. Since then, there have been some patents related to nanometer clay/waterborne polyurethane composites. In Taiwanese Patent No. 230181 for example, a method is disclosed for making waterborne polyurethane/clay nanocomposites. C6~C18 alkyl diamine are used to modify clay, the modified clay is used with waterborne polyurethane to form a pre-polymer, and they form a stable dispersion after the molecular chain is extended.

In Taiwanese Patent No. 263628 for example, a method is disclosed for making modified clay and polyurethane resin/clay nanocomposites. A lipophilic modifier and a reactive modifier of a structure that includes —OH and —NH are used. The reactive modifier includes a functional group for reacting with polyurethane resin. The gallery between two adjacent layers of the modified clay is increased to 14.6 to 60 Å. In the composites and dispersion, the gallery between two adjacent layers of the modified clay can be increased by 5 to 10 Å, and the tensile strength and wear-resistance are increased.

In Taiwanese Patent No. 165322, a method is disclosed for modifying clay by a multi-functional organic material and an elastic nanometer clay/polyurethane composite made of polyurethane and multi-functional reactive organic clay to considerably increase the thermo-tolerance and mechanical properties of polyurethane but reduce the water-absorption of polyurethane.

In Taiwanese Patent No. 261594, a method is disclosed for making dispersion of waterborne polyurethane/clay nanocomposites and its use in coating. Nanometer clay is modified by long alkyl or quaternary ammonium salt and used as a flame retardant, and mixed and polymerized with synthetic polyurethane to produce waterborne polyurethane with flame-retardant property. In addition, 50~75 wt % of unmodified clay that is hydrophilic can be added into the waterborne polyurethane. Hydrophilic, suspended, stable, composite emulsion is flame-retardant, and the clay renders the coating more flame-retardant and increases the tensile strength of the coating without jeopardizing the adhesiveness of the emulsion.

In U.S. Pat. No. 6,203,901, disclosed are composite fibers and coating materials that include polyurethane resin and nanometer delaminated clay. The clay is modified by quaternary onium salts such as ammonium salts, phosphonium salts and sulphonium salts.

In U.S. Pat. No. 6,533,975, a method is disclosed to prepare nanocomposites and films that include polyurethane resin and delaminated clay. The polyurethane/clay dispersion is made of aprotic polar solvents such as dimethylacetamide by solution intercalation. Hence, nanometer laminated inorganic polymer composites increase mechanical strength, thermostability, flame-retardant ability, solvent-resistance and gas barrier ability.

None of the foregoing papers is focused on using reactive monomer with selective reactivity to modify organic/inorganic clay and using the modified clay to make clay/waterborne polyurethane composites. Hence, there is still room for improving the physical properties of waterborne polyurethane.

The present invention is therefore intended to obviate or at least alleviate the problems encountered in prior art.

SUMMARY OF INVENTION

It is an objective of the present invention to provide a method for making waterborne polyurethane with increased molecular weight and enhanced physical properties.

It is another objective of the present invention to provide a method for making a clay/waterborne polyurethane nanocomposite with enhanced physical properties.

It is another objective of the present invention to provide a method for making waterborne polyurethane with excellent stability in storage and enhanced mechanical properties and hydrolysis resistance.

It is another objective of the present invention to provide a method for making waterborne polyurethane for industrial coatings and films.

To achieve the foregoing objectives, a method includes the step of introducing a small molecular diol monomer with a reactive functional group into waterborne polyurethane backbone by pre-polymerization to produce a side-chain crosslinkable pre-polymer, and the step of reacting the pre-polymer with hydrophilic diamine for chain extension and inter-crosslink to provide waterborne polyurethane with different crosslink degree. The small molecular diol monomer is expressed by structural formula (I) and the polyurethane pre-polymer with the reactive functional group connected to the side chain is expressed by structural formula (II) as follows:

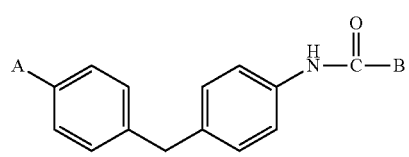

(I)

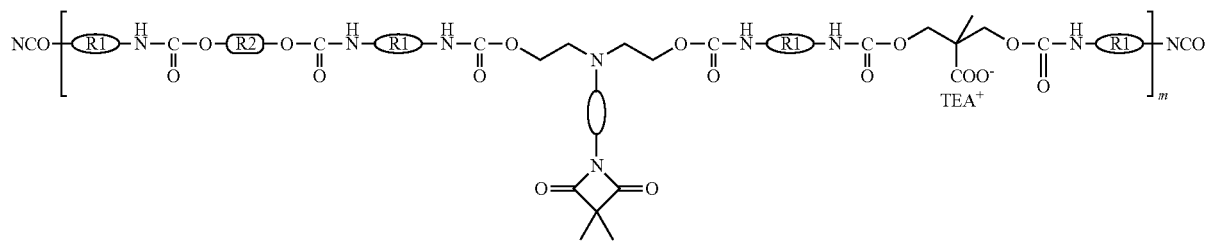

(II)

A is azetidine-2,4-dione functional group

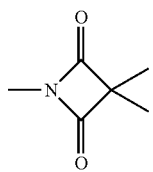

or malonamide-linked alkyl group

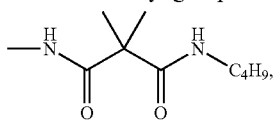

and B is nitrogen-linked di-hydroxy terminal group

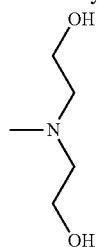

or tertiary amine-linked di-hydroxy terminal group

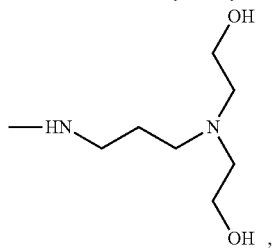

R1 is diisocyanate, and R2 is a polyol backbone.

In an aspect, the polyurethane pre-polymer of structural formula equation (II) is introduced by an ionic group and neutralized by triethylamine for waterborne dispersion and self-emulsifiable stable, wherein the ionic group is dimethylol propionic acid, sulfonic acid sodium salt or cationic tertiary amine salt.

In another aspect, the diisocyanate includes aliphatic compounds isocyanate and/or aromatic isocyanate, wherein the aliphatic compounds isocyanate is hexamethylene diisocyanate, bis(cyclohexyl)methylene diisocyanate, or isophorone diisocyanate, wherein the aromatic isocyanate is toluene diisocyanate or methylene di-p-phenyl diisocyanate.

In another aspect, the diisocyanate is 100% aliphatic isocyanate, or a mixture of aliphatic and aromatic isocyanate. In another aspect, the concentration of the aromatic isocyanate is 10 mol % to 40 mol % and, preferably, 35 mol % to 40 mol % with respect to the total moles of isocyanate in the mixture of aliphatic and aromatic isocyanate.

In another aspect, the long-chain polyol is polyether polyol or polyester polyol. The polyether polyol is polyether polypropyl glycol or polytetramethylene ether glycol. The polyester polyol is polycaprolactone glycol, polyhexanediol-co-adipate glycol or polybutanediol-co-adipate glycol.

In another aspect, the molecular weight of the polyol is 800 to 2500.

In another aspect, the polyurethane pre-polymer in structural formula 2 includes a hydrophilic cosolvent that is acetone, methyl ethyl ketone, N-methyl-2-pyrrolidone or N,N-dimethylformamide.

In another aspect, the waterborne polyurethane is solvent polyurethane or heat-molten polyurethane.

In another aspect, the compound of structural formula (1) is a short-chain diol monomer with a reactive side-chain azetidine-2,4-dione functional group, and can be turned into the polyurethane pre-polymer with the side-chain azetidine-2,4-dione functional group in the pre-polymerization and react with hydrophilic di-amine for chain extension and inter-crosslink, wherein A is

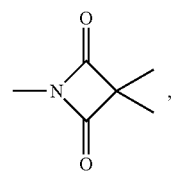

and B is

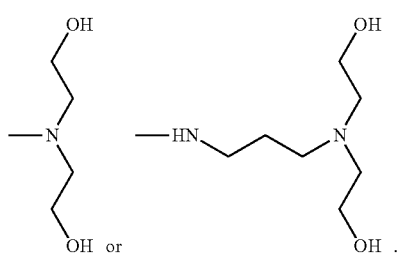

In another aspect, the side-chain azetidine-2,4-dione group of pre-polymer undergoing ring-opening reactions with selective aliphatic primary amines group to form malonamide linkages to form a inter-crosslink structure, wherein the hydrophilic di-amine is ethylene diamine, butylene diamine, hexylene diamine or isophorone diamine.

In another aspect, the compound of structural formula (I) is a short-chain diol monomer containing a tertiary amine structure, and can be used as a clay intercalation modifier for modifying layered clay, and can be used with the polyurethane pre-polymer to make a nanocomposite via in-situ polymerization, wherein A is

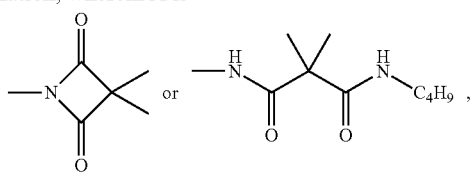

and B is

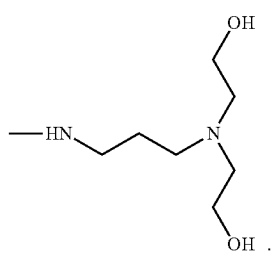

In another aspect, the intercalation modifier for the layered clay increases the gallery between two adjacent layers of the layered clay to increase the organic compatibility so that the gallery is 25.5 to 30.5 Å.

In another aspect, the cationic exchange capacity of the intercalation modifier for the layered clay is 50 to 200 meq/100 g in the intercalation modification.

In another aspect, the layered clay is selected from the group consisting of semctite clay, vermiculite, halloysite, sericite, saponite and mica.

In another aspect, the intercalation modifier is bonded with the polyurethane pre-polymer, wherein the hydroxyl group of the intercalation modifier reacts with the isocyanate group (—NCO) of the polyurethane pre-polymer to provide urethane bonding.

In another aspect, the clay/polyurethane nanocomposite dispersion includes 5 wt % to 15 wt % of hydrophilic cosolvent, 20 wt % to 50 wt % of polyurethane resin, 0.5 wt % to 10 wt % of organic modified clay, and water, wherein the wt % is with respect to the nanocomposite.

In another aspect, the hydrophilic cosolvent is N-methyl pyrrolidone.

In another aspect, the nanocomposite in the in situ polymerization includes polyester, polyurethane and or epoxy that can be polycondensation with the hydroxyl group monomer.

In another aspect, the method involves making a clay/polyurethane nanocomposite by providing an isocyanate (NCO)-terminated prepolymer with a side-chain reactive functional group by admixing (i) at least one diisocyanate, (ii) at least one difunctional polyol, (iii) a short-chain diol monomer having a side-chain reactive functional group or a modified clay thereof, (iv) at least one hydroxy carboxylic acid compound and (v) a hydrophilic cosolvent; neutralizing the NCO-terminated prepolymer with a tertiary amine; dispersing the NCO-terminated prepolymer in water; and admixing the NCO-terminated prepolymer with at least one chain extending agent comprising a hydrophilic diamine; wherein the short-chain diol monomer (iii) is expressed by structural formula (I):

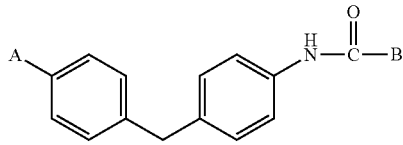

(I)

wherein, A is an azetidine-2,4-dione functional group

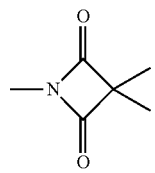

or a malonamide-linked alkyl group

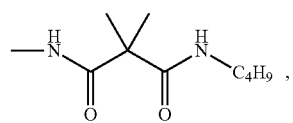

and B is a nitrogen-linked di-hydroxy terminal group

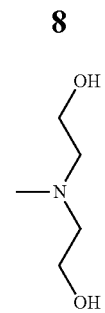

or tertiary amine-linked di-hydroxy terminal group

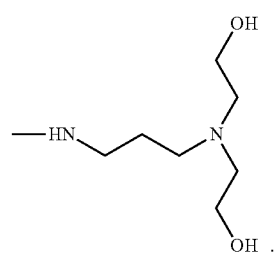

In another aspect, the compound of structural formula (I) is a short-chain diol with a pendent azetidine-2,4-dione functional group, wherein A is

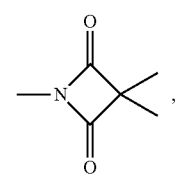

and B is

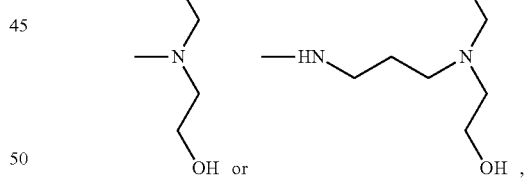

wherein the short-chain diol monomer (iii) was synthesized by reacting IDD [4-isocyanato-4'(3,3-dimethyl-2,4-dioxo-azetiddino)diphenylmethane] with diethanolamine or N-(3-aminopropyl)diethanolamine.

In another aspect, the compound of structural formula (I) is a short-chain diol with a pendent malonamide-linked alkyl group, wherein A is

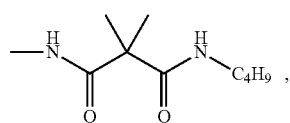

and B is

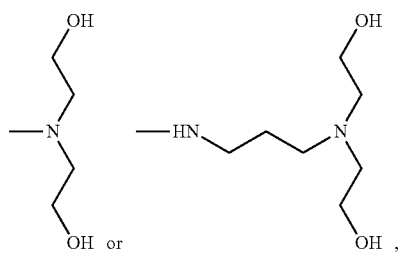

wherein the short-chain diol monomer (iii) was synthesized by reacting IDD with diethanolamine or N-(3-aminopropyl) diethanolamine, and then reacting with n-butyl amine.

In another aspect, the modified clay thereof is produced by acidifying the compound of structural formula (I) with an inorganic acid, and admixing a clay with the acidified short chain diol monomer of structural formula (I), wherein the compound of structural formula (I) serves as a layered clay intercalating agent, wherein the compound of structural formula (I) is a short-chain diol with a pendent tertiary amine-linked di-hydroxy terminal group; wherein A is

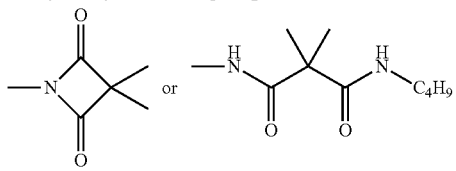

and B is

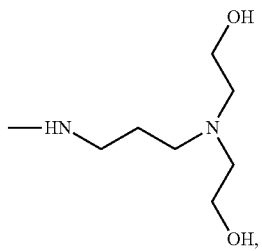

wherein the short-chain diol monomer (iii) was synthesized by reacting IDD [4-isocyanato-4'(3,3-dimethyl-2,4-dioxo-azetiddino)diphenylmethane] with N-(3-aminopropyl)di-ethanolamine, and then reacting with n-butyl amine.

In another aspect, the (iv) at least one hydroxy carboxylic acid compound is selected from the group consisting of dimethylolpropionic acid (DMPA), dimethylol butanioc acid (DMBA), and mixtures thereof.

In another aspect, the diisocyanate is 100 mol % aliphatic isocyanate, or a mixture of aliphatic and aromatic isocyanate. In another aspect, the concentration of the aromatic isocyanate is 10 mol % to 40 mol % with respect to the total moles of isocyanate in the mixture of aliphatic and aromatic isocyanate.

In another aspect, the (ii) at least one difunctional polyol is chosen from polyether polyol or polyester polyol. In another aspect, the molecular weight of the polyol is 800 to 2500.

In another aspect, the (v) hydrophilic cosolvent is chosen from acetone, methyl ethyl ketone, N-methyl-2-pyrrolidone and N,N-dimethylformamide.

In another aspect, the hydrophilic di-amine chain extending agent is chosen from ethylene diamine, butylene diamine, hexylene diamine and isophorone diamine.

In another aspect, the compound of formula (I) acts to increase the gallery between two adjacent layers of the clay to increase the organic compatibility so that the gallery is 25.5 to 30.5 Å.

In another aspect, the clay has a cation exchange capacity between 50 and 200 meq/100 g.

In another aspect, the clay is selected from the group consisting of smectite clay, vermiculite, halloysite, sericite, saponite and mica.

In another aspect, the clay/polyurethane nanocomposite dispersion includes 5 wt % to 15 wt % of hydrophilic cosolvent, 20 wt % to 50 wt % of polyurethane resin, 0.5 wt % to 10 wt % of organic modified clay and water with respect to the nanocomposite.

In another aspect, the aliphatic isocyanate is chosen from hexamethylene diisocyanate, bis(cyclohexyl)methylene diisocyanate, or isophorone diisocyanate, and wherein the aromatic isocyanate is toluene di-isocyanate or methylene di-p-phenyl diisocyanate.

In another aspect, the polyether polyol is chosen from polyether polypropyl glycol or polytetramethylene ether glycol, and wherein the polyester polyol is chosen from polycaprolactone glycol, polyhexanediol-co-adipate glycol and polybutanediol-co-adipate glycol.

Other objectives, advantages and features of the present invention will be apparent from the following description referring to the attached drawings.

BRIEF DESCRIPTION OF DRAWINGS

The present invention will be described via detailed illustration of the preferred embodiment referring to the drawings wherein.

DETAILED DESCRIPTION OF PREFERRED EMBODIMENT

Figure 1:
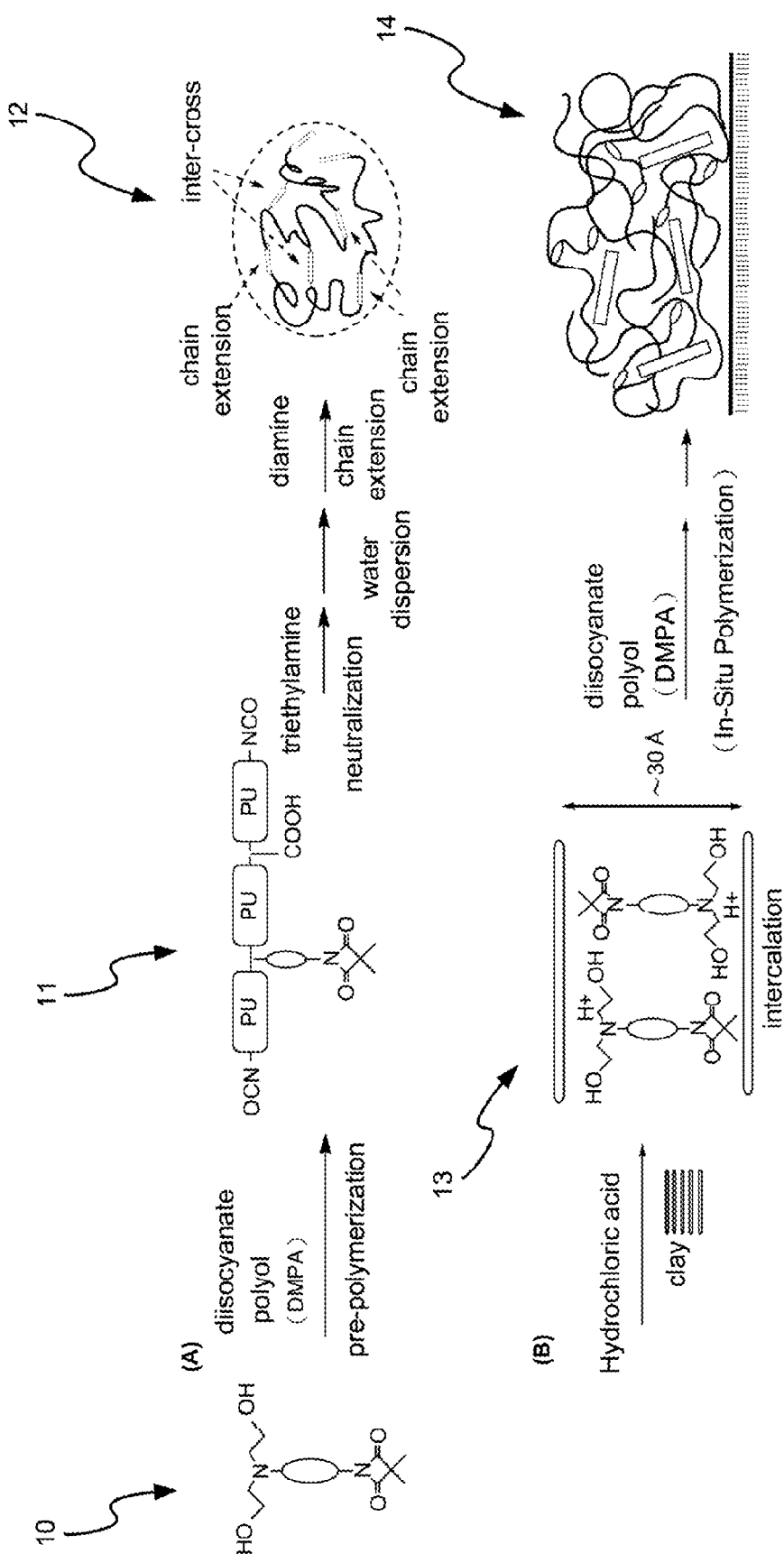
FIG. 1 is a perspective view of according to the preferred embodiment of the present invention.
Figure 2:
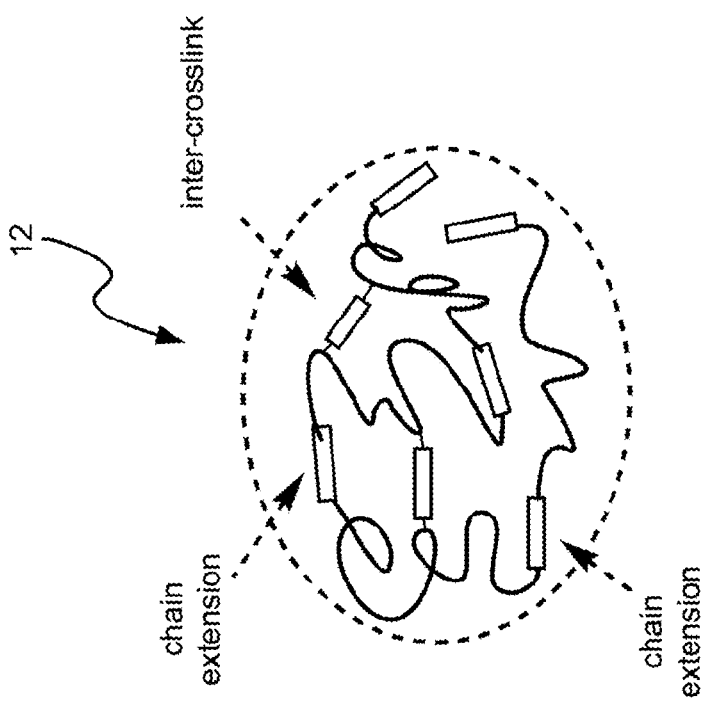
FIG. 2 is an exploded view of the shown in FIG. 1.
Figure 2:
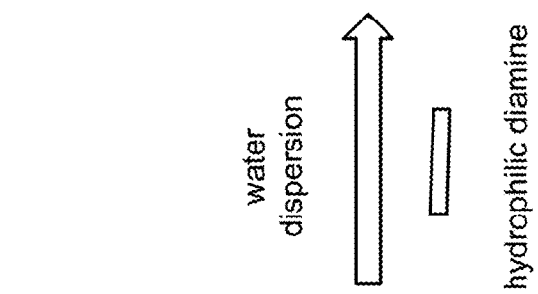
Figure 2:
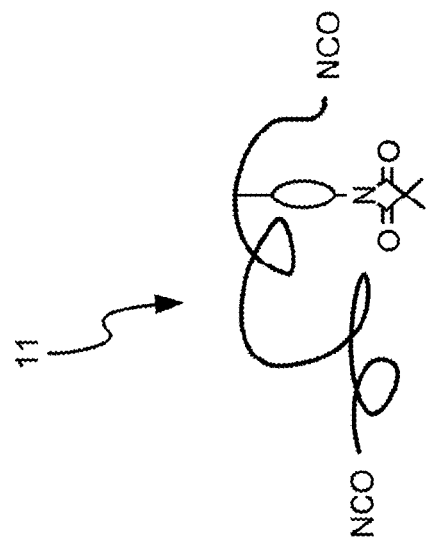
Figure 3:
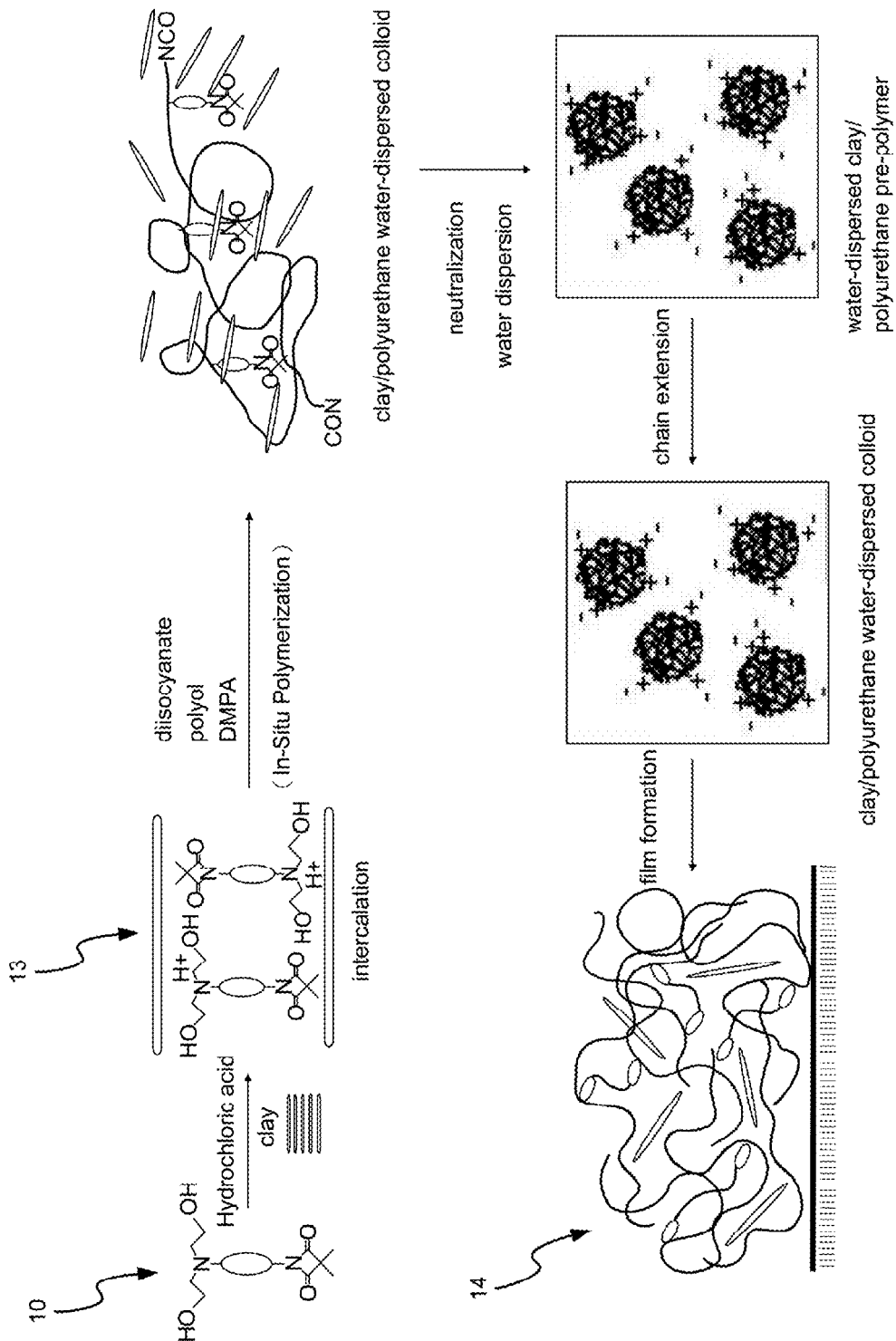
FIG. 3 is a cross-sectional view of the shown in FIG. 1.

Referring to FIGS. 1 to 3, there is shown a method for making waterborne polyurethane with a reactive functional group and a nanocomposite based on the waterborne polyurethane chemistry. At first, by pre-polymerization, a short-chain diol monomer 10 with a reactive functional group is introduced into the backbone of a polyurethane polymer to provide a polyurethane pre-polymer 11.

The polyurethane pre-polymer 11 reacts with amine for chain extension and inner-crosslink, thus providing inter-crosslink, waterborne polyurethane dispersion 12.

Furthermore, a short-chain diol monomer of a tertiary amine structure can be used as an intercalation modifier for modifying clay to provide organic modified clay 13. Except retaining the reactive properties of azetidine-2,4-dione, it can react with a polyurethane pre-polymer to provide a waterborne polyurethane/clay nanocomposite 14 by in-situ polymerization.

The compound of structural formula (I) is a short-chain diol monomer containing a tertiary amine structure, and can be used as a clay intercalation modifier for modifying layered clay, and can be used with the polyurethane pre-polymer to make a nanocomposite via in-situ polymerization, wherein A is

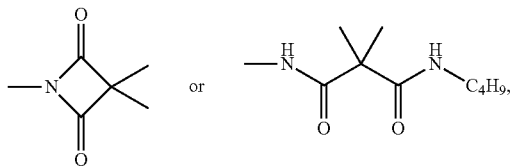

and B is

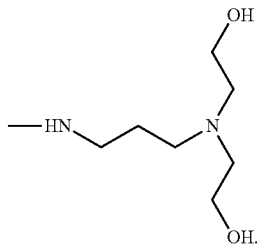

Figure 8:
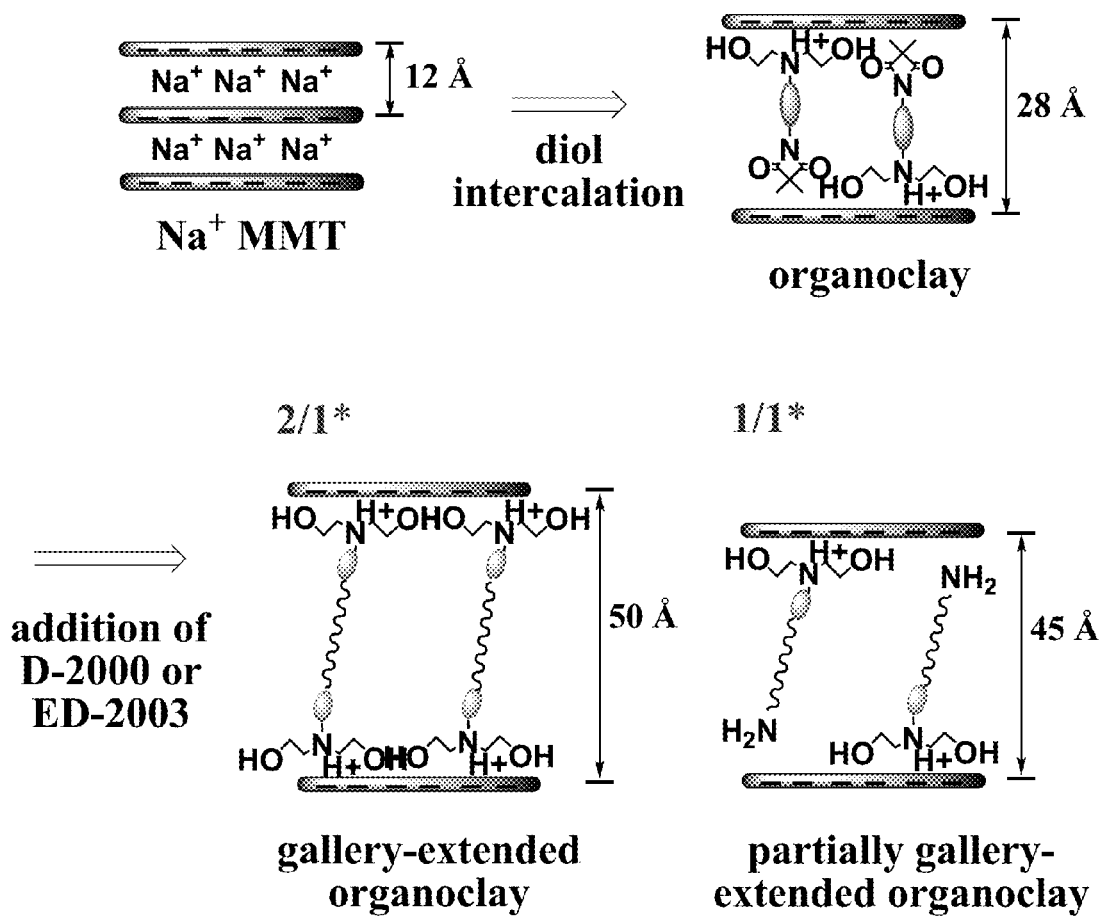
FIG. 8 is a scheme illustrating a method for producing modified clay.

With reference to FIG. 8, "modified clay" can be produced when a short-chain diol monomer containing a tertiary amine structure is used as a clay intercalation modifier for modifying layered clay. This can be used with the polyurethane prepolymer to make nanocomposites via in situ polymerization. Thus, a short-chain diol monomer such as Compound I-2 in the examples is fit for such modification. The scheme in FIG. 8 illustrates the process toward "modified clay".

Referring to FIG. 2, the polyurethane pre-polymer 11 is dispersed in water, and branching and entanglement between molecules are increased via hydrophilic amine chain extension and inter-crosslink, thus increasing the mechanical properties, wear-resistance, thermal properties and hydrolysis resistance. The hydrophilic amine may be hydrophilic diamine such as ethylene diamine ("EDA"), butylene diamine ("BDA"), hexylene diamine ("HAD") and isophorone diamine ("IPDA").

Referring to FIG. 3, the short-chain diol compounds I-2 and I-4, each of which includes an active tertiary amine was acidified by an equimolar ratio of hydrochloric acid (HCl) and then ion-exchange with montmorillonite ("MMT"). In the layered configuration of nanometer clay, an exfoliation of the layered structure through organic ion exchange is considerably difficult because of the intensive platelet ionic attraction. The clay is modified by exchange of ions, and a short-chain diol monomer is embedded in the modified clay for in situ polymerization. Thus, the layered structure of the clay is completely dispersed, and an organic/inorganic nanocomposite is made.

Examples of the method of the invention will be described.

EXAMPLE 1

Short-Chain Diol Compound I-1

Methylene di-p-phenyl diisocyanate ("MDI") and isobutyryl chloride are dissolved in xylene and triethylamine ("TEA") to provide a monomer, i.e., IDD (4-isocyanato-4'(3, 3-dimethyl-2,4-dioxo-azetidino)diphenylmethane). The reaction is represented by the following chemical formula:

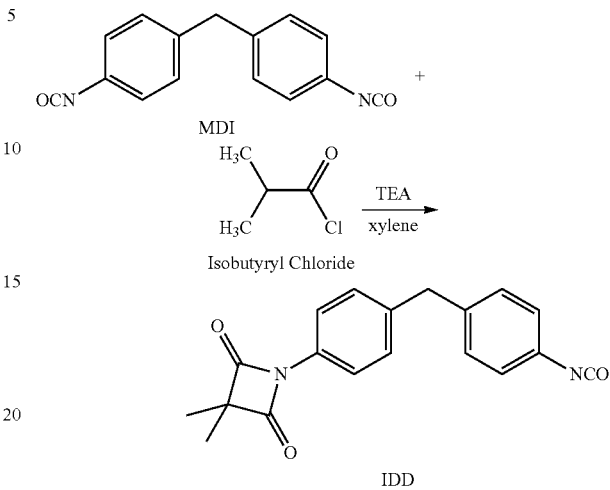

Then, 11.4 grams of IDD [4-isocyanato-4'(3,3-dimethyl-2, 4-dioxo-azetiddino)diphenylmethane] and 3 grams of diethanolamine ("DEA") are dissolved in tetrahydrofuran ("THF") at 0° C. for 3 to 4 hours to provide a dual-functional, short-chain diol compound I-1. For several times, cyclohexane is used to wash away excessive reactants and impurities so that a white solid is obtained, at a yield of 87%. The reaction is represented by the following chemical formula:

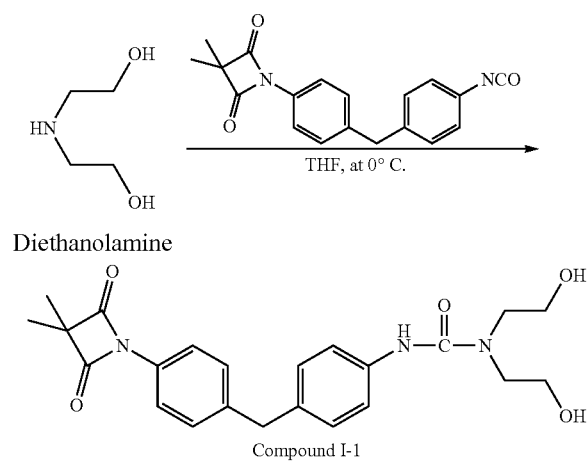

EXAMPLE 2

Short-Chain Diol Compound I-2

11.4 grams of IDD and 4.5 grams of N-(3-Aminopropyl) diethanolamine, ("APDEA") are dissolved in THF at 0° C. for 3 to 4 hours to make a dual-functional, short-chain diol compound I-2. For several times, cyclohexane is used to wash away excessive reactants and impurities to obtain a white solid at a yield of 85%. The reaction is represented by the following chemical formula:

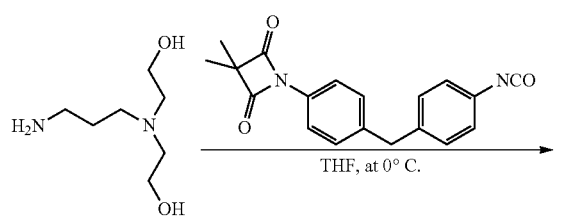

APDEA

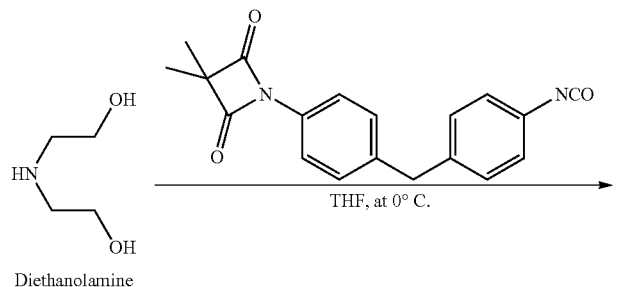

Compound 1-2

EXAMPLE 3

Short-chain Diol Compound I-3

IDD and DEA are used to make 10 grams of short-chain diol compound I-1. 1.72 grams of N-butyl amine ("$C_4H_9NH_2$") is used to execute ring-opening at the end of the short-chain diol compound I-1 to make short-chain diol compound I-3 without any reactive terminal group. For several times,

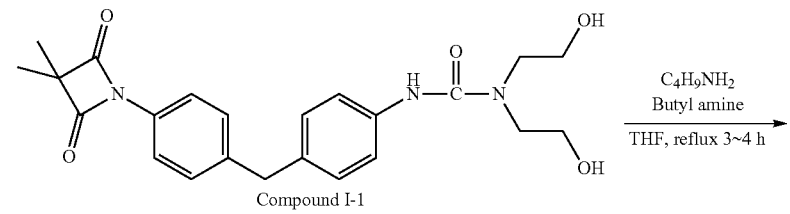

Diethanolamine

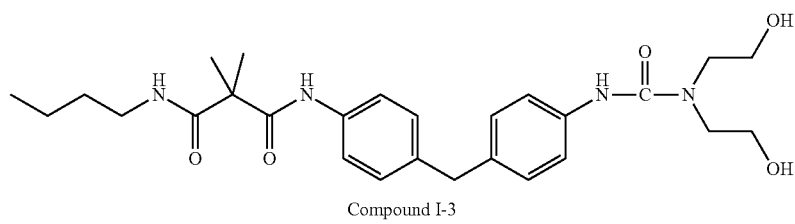

Compound I-1 cyclohexane is used to wash away excessive reactants and impurities so that a white solid is obtained, at a yield of 80%. The reaction is represented by the following chemical formula:

EXAMPLE 4

Modified Clay

FIG. 8 shows a process for producing the modified clay. A short-chain diol monomer such as compound 1-2 is fit for such modification. The short-chain diol monomer containing a tertiary amine structure can be used for a clay intercalation modifier for modifying layered clay, and can be used with a polyurethane prepolymer to make a nanocomposite via in situ polymerization. The intercalation modifier for the layered clay increases the gallery between two adjacent layers of the layered clay to increase the organic compatibility so that the gallery is about 25.5 to about 30.5 Å.

The short-chain diol compound I-2, with an active tertiary amine, is used to modify cation clay such as MMT so that the gallery between two adjacent layers of the clay is expanded. 5.796 grams of the short-chain diol compound I-2 is dissolved in a proper amount of THF, neutralized by equivalent hydrochloric acid (HCl: 37.5%, 1.168 grams), and introduced into clay paste that has been swelled by hot water (10 grams of clay/1 liter of de-ionized water) at 60° C. to 80° C. for intercalation for 8 hours. Then, the modified clay is filtered and washed by de-ionized water and THF for several times, and baked at 100° C. The organic modification of the clay is executed according to a process shown in FIG. 3.

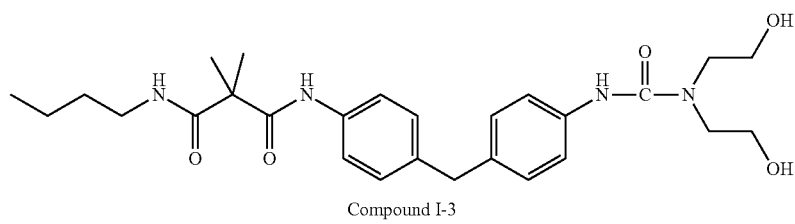

Compound I-3

EXAMPLE 5

Inter-crosslink Waterborne Polyurethane 18.65 grams of isophorone diisocyanate ("IPDI"), 35 grams of polytetramethylene ether glycol ("PTMEG"; molecular weight 2000), 3 grams of dimethylol propionic acid ("DMPA") and 10.77 grams of the compound I-1 are dissolved in 15 grams of acetone or methyl ethyl ketone ("MEK"). A drop of T-12 catalyst is added into the solution, and the solution is stirred mechanically at 60~70° C. with nitrogen introduced therein for 3.5 hours. Then, the solution is cooled to 50° C. Then, 2.22 grams of triethylamine ("TEA") is added into the solution for reaction for 15 minutes. The solution is quickly stirred while 140 grams of de-ionized water is added into the solution and evenly emulsified. Then, 1.86 grams of ethylene diamine ("EDA") is dissolved in 5 grams of water for chain extension and inter-crosslink. Thus, there is provided waterborne polyurethane dispersion with 30% of solid. The di-isocyanate:polyol:DMPA proportion is 4.8:1:1.26. By changing the weight proportion of the compound I-1 and the ethylene diamine, waterborne polyurethane with different inter-crosslink degree are made.

EXAMPLE 6

Post-crosslinkable Waterborne Polyurethane

In a process and at a proportion similar to that of Example 5, a short-chain diol such as ethylene glycol is used to replace the chain-extending agent of ethylene diamine, not the announced inter-crosslink structure. The reaction lasts for 12 hours, and a proper amount of acetone or MEK is used to adjust the viscosity. Then, neutralization and emulsification are executed to provide waterborne polyurethane dispersion with 25% to 30% of solid. By changing the proportion of the compound I-1 and the short-chain diol, waterborne polyurethane are made with different physical properties. When a film is made, half-normal short-chain diol such as ethylene diamine is used for post-curing with azetidine-2,4-dione functional group at the side chain.

EXAMPLE 7

Layered Clay/Waterborne Polyurethane 18.65 grams of isophorone diisocyanate, 35 grams of polyester-type polyol RS-956 [poly(ethylene butylene adipated) diol; molecular weight 2000], 3 grams of DMPA and 1.56 grams of ethylene glycol are heated and dissolved in 15 grams of cosolvent such as acetone, MEK and N-Methyl-2-Pyrrolidone ("NMP"). A drop of T-12 catalyst is added into the solution, and the solution is stirred mechanically at 60~70° C. with nitrogen introduced therein for 2 to 2.5 hours. Then, the solution is added with the modified clay (3.5 grams of compound I-2/MMT, about 5 wt %, about 0.05 mole must be included in the equivalent of the short-chain diol). A proper amount of solvent is used to adjust the dispersion and viscosity. After 2 to 3 hours, the solution is cooled to 50° C. Then, 2.22 grams of TEA is used to neutralize the solution. After 15 minutes, the solution is quickly stirred while 160 grams of de-ionized water is added into the solution of emulsification and even dispersion. Then, 1.31 grams of ethylene diamine dissolved in 5 grams of water was added. The filling is executed slowly for chain extension and inter-crosslink to provide nanometer clay/waterborne polyurethane dispersion with 30 wt % of solid. The isophorone diisocyanate:polyol:DMPA proportion is 4.8:1:1.26. By changing the proportion of the diol, ethylene glycol and ethylene diamine and the content of modified clay, a series of clay/waterborne polyurethane nanocomposites are made.

COMPARABLE EXAMPLE 1

Linear Waterborne Polyurethane

In a process and at a proportion similar to that of Example 5, 1.56 grams of ethylene glycol are used to replace the compound I-1, and the amount of the ethylene diamine is changed to be 1.15 grams, and the amount of the de-ionized water is changed to be 145 grams. The final concentration of the solid is about 30%. By changing the proportion of the ethylene glycol and ethylene diamine, conventional waterborne polyurethane resins are made.

COMPARABLE EXAMPLE 2

Side-chain Hard Segment Waterborne Polyurethane

In a process and at a proportion similar to that of Example 5, 12.55 grams of the short-chain diol compound I-3 are used instead of the compound I-1, and the amount of the ethylene diamine is changed to be 1.17 grams, and the amount of the de-ionized water is changed to be 153 grams. The final concentration of solid is about 30%. By changing the proportion of the compound I-3 and the ethylene diamine, waterborne polyurethane resins with increased side-chain hard segment proportion are made.

The compositions of the waterborne polyurethane and colloid of the present invention are listed in Table 1. NMP (6 wt % to 8 wt %) is used as the cosolvent, and the final concentration of solid is 30 wt %. 90 plus particle size analyzer made by Brookhaven is used for measuring the particle sizes, and Malvern Nano-ZS is used for measuring the zeta potentials. As listed in Table 1, the average size of the dispersion is smaller than 100 nanometer ("nm"), and possesses high zeta potential (lower than 41 mV), and exhibits excellent stability in storage. Moreover, the structure and properties of the product of the present invention can be understood from the following chart and analysis:

TABLE 1

| | Composition (Molecular Proportion) | | | | | | | Hard | | |
| | short-chain diol | | | | | | | segment/ | | Zeta |
| No. | Molecular Proportion | Weight Ratio | EDA | IPDI | PTMEG | DMPA | TEA | Soft segment | Size (nm) | potential (mV) |
| | Compound I-1 | | | | Inter-Crosslink Polyurethane | | | | | |
| N1 | 0.08 | 1 | 2.50 | 4.8 | 1 | 1.26 | 1.26 | 43.67/56.33 | 46 | −69.65 |

TABLE 1-continued

| | Composition (Molecular Proportion) | | | | | | | Hard | | Zeta |
|---|---|---|---|---|---|---|---|---|---|---|
| | short-chain diol | | | | | | | segment/ | | |
| No. | Molecular Proportion | Weight Ratio | EDA | IPDI | PTMEG | DMPA | TEA | Soft segment | Size (nm) | potential (mV) |
| N5 | 0.43 | 5 | 2.34 | 4.8 | 1 | 1.26 | 1.26 | 45.59/ 54.41 | 48 | −72.37 |
| N10 | 0.92 | 10 | 2.08 | 4.8 | 1 | 1.26 | 1.26 | 48.31/ 51.57 | 58 | −54.66 |
| N15 | 1.44 | 15 | 1.86 | 4.8 | 1 | 1.26 | 1.26 | 51.71/ 48.89 | 68 | −65.00 |
| | Ethylene glycol | | Linear Polyurethane (Comparable Example 1) | | | | | | | |
| L1 | 0.08 | 0.15 | 2.46 | 4.8 | 1 | 1.26 | 1.26 | 43.13/ 56.87 | 43 | −63.76 |
| L5 | 0.43 | 0.76 | 2.14 | 4.8 | 1 | 1.26 | 1.26 | 43.17/ 56.83 | 46 | −59.03 |
| L10 | 0.92 | 1.62 | 1.62 | 4.8 | 1 | 1.26 | 1.26 | 43.15/ 56.85 | 41 | −69.23 |
| L15 | 1.44 | 2.51 | 1.11 | 4.8 | 1 | 1.26 | 1.26 | 43.16/ 56.84 | 57 | −65.36 |
| | Compound I-3 | | Side-chain hard segment Waterborne Polyurethane (Comparable Example 2) | | | | | | | |
| S1 | 0.08 | 1.15 | 2.46 | 4.8 | 1 | 1.26 | 1.26 | 43.70/ 56.30 | 56 | −48.8 |
| S5 | 0.43 | 5.72 | 2.14 | 4.8 | 1 | 1.26 | 1.26 | 46.03/ 53.97 | 92 | −41.2 |
| S10 | 0.92 | 11.64 | 1.62 | 4.8 | 1 | 1.26 | 1.26 | 48.99/ 51.01 | 73 | −48.5 |
| S15 | 1.44 | 17.29 | 1.11 | 4.8 | 1 | 1.26 | 1.26 | 51.78/ 48.22 | 165 | −64.3 |

Figure 4:
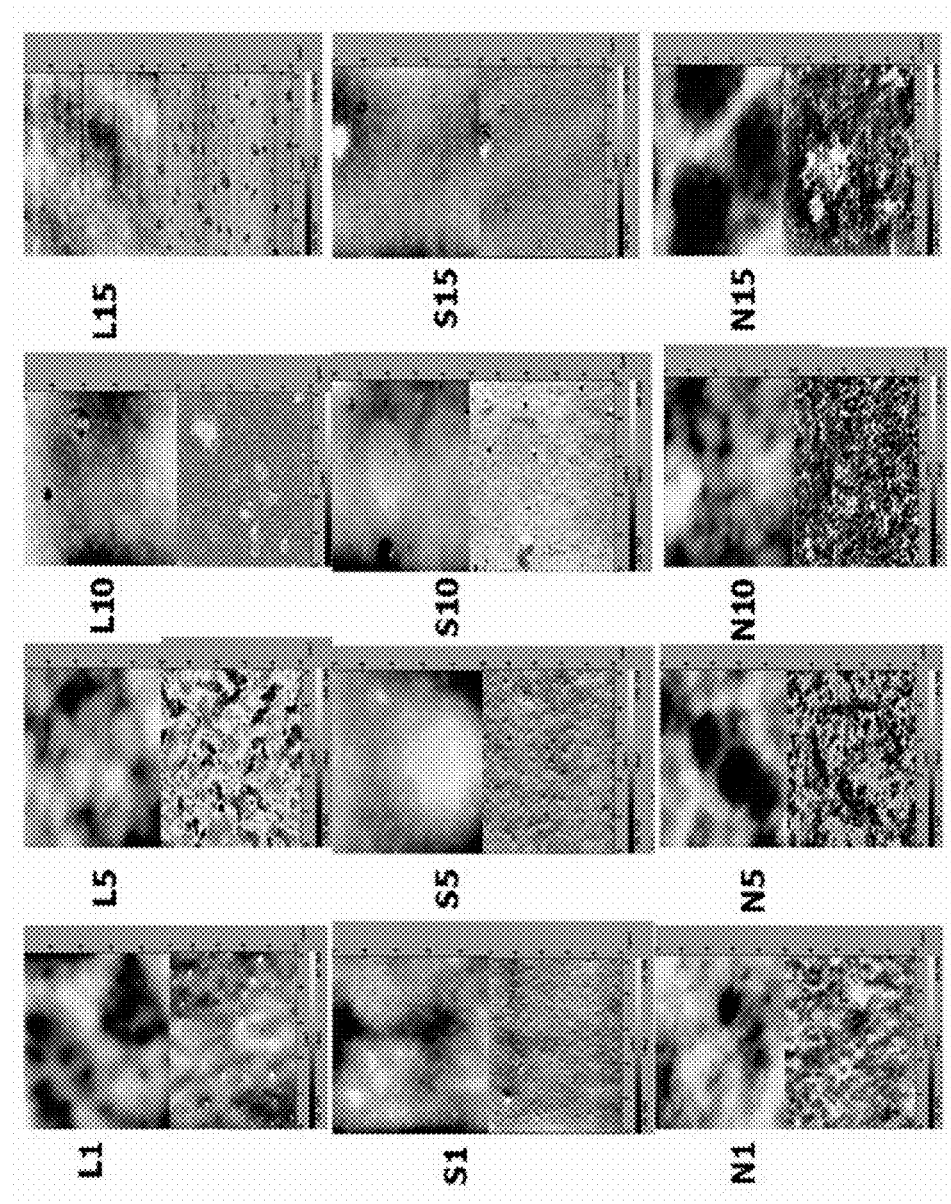
FIG. 4 is atomic force microscopy (AFM) morphology of the waterborne polyurethane of the present invention.

Referring to FIG. 4, atomic force microscopic ("AFM") images of the waterborne polyurethane of the present invention are shown. There is a 5μ-scale variation in the images of the waterborne polyurethane polymer. In FIG. 4, "L" represents the linear waterborne polyurethane, and "S" represents the side-chain hard segment waterborne polyurethane, and "N" represents the inter-crosslink waterborne polyurethane. The entire state of the waterborne polyurethane soft/hard segment is shown in AFM phase of the waterborne polyurethane polymer. By the variation in color, the distribution of the hydrophilic and hydrophobic components and hard and soft components can be understood. The topographies are shown. It is observed that microphase separation is irrelevant to the roughness on the surface. It is also observed that phase separation gets higher with the crosslink. Observed in the AFM, there is no obvious microphase separation in the side-chain hard segment (S-series) polyurethane and linear (L-series) polyurethane.

Figure 5:
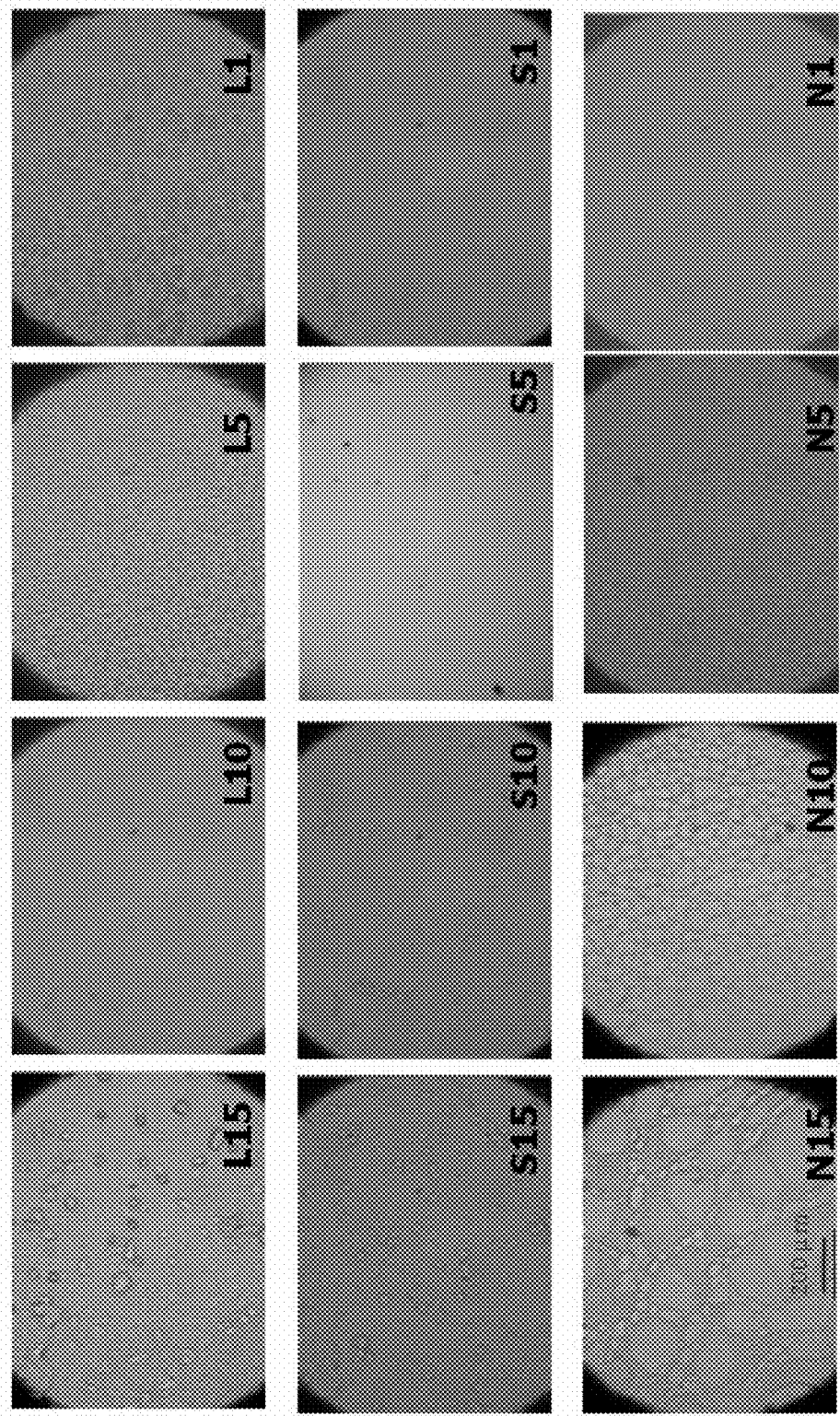
FIG. 5, is a polarized optical micrograph (POM) morphology of the waterborne polyurethane of the present invention.

Referring to FIG. 5, there are shown polarizing optical microscope ("POM") images of the waterborne polyurethane. Microphase separation of the heat-treated waterborne polyurethane polymers is shown. It was observed some phase separation composed of individual ball-like subunits for the linear (L-series) polyurethane. The phase separation of the inter-crosslink (N-series) polyurethane increases with the crosslink degree, and the higher crosslinked N15 is the most obvious case. There is no obvious phase separation in the side-chain hard segment (S-series) polyurethane.

Moreover, the tensile strength of a dry film of waterborne polyurethane of the present invention is 190 to 230 kg/cm$^2$ (increased by 325%). The 100% modulus is higher than 110 Kg/cm$^2$ (increased by 244%). The maximum extension is 300% to 500%. In addition to the increasing of the mechanical properties, the hydrolysis resistance increases. Tests are run with AI-3000 produced by Gotech, and the results are listed in Table 2. The physical properties of the films are measured in compliance with the regulations of JISK-6897, and the films are placed in water at 60° C. for 12 hours, and placed in 3 wt % sodium hydroxide solution for hydrolysis at 60° C. for 12 hours.

TABLE 2

| No. | Yield Stress (MPa) | Tensile Strength (MPa) | 100% Modulus (MPa) | Elongation (%) | Hydrolytic stability (retention %) | |
|---|---|---|---|---|---|---|
| | | | | | Hot Water | Hot Sodium Hydroxide Solution |
| Inter-Crosslink Polyurethane | | | | | | |
| N1 | 4.32 | 23.03 | 4.62 | 436 | 94.49 | 96.56 |
| N5 | 7.42 | 22.83 | 7.89 | 345 | 74.62 | 95.99 |
| N10 | 7.91 | 19.29 | 8.02 | 300 | 94.13 | 94.56 |
| N15 | 14.04 | 20.85 | 11.27 | 333 | 79.01 | 76.55 |
| Linear polyurethane (Comparable Example 1) | | | | | | |
| L1 | 5.35 | 28.34 | 5.73 | 465 | 88.15 | 76.64 |
| L5 | 3.93 | 19.78 | 4.14 | 1020 | 27.69 | — |

TABLE 2-continued

| No. | Yield Stress (MPa) | Tensile Strength (MPa) | 100% Modulus (MPa) | Elongation (%) | Hydrolytic stability (retention %) | |
|---|---|---|---|---|---|---|
| | | | | | Hot Water | Hot Sodium Hydroxide Solution |
| L10 | 3.38 | 10.80 | 3.47 | 1021 | — | — |
| L15 | 3.23 | 8.51 | 3.33 | 932 | — | — |
| Side-chain hard segment Waterborne Polyurethane (Comparable Example 2) | | | | | | |
| S1 | 3.73 | 11.57 | 3.82 | 524 | 82.89 | 58.34 |
| S5 | 3.73 | 6.02 | 3.56 | 527 | 75.62 | 31.67 |
| S10 | 4.13 | 4.18 | 3.72 | 505 | 53.13 | 35.60 |
| S15 | 4.77 | 2.98 | 3.65 | 283 | — | — |

From Table 1, it is observed that the tensile strength of the non-crosslink waterborne polyurethane films decreases as they are hydrolyzed. In Table 2, integrated area difference, i.e., the retention %, is shown. The problem of the declining of the physical properties is reduced in the inter-crosslink waterborne polyurethane film. It is evidenced that the introduction of the reactive monomer of the present invention is beneficial for the performance of the polymer. By introducing the monomer into the polyurethane polymer, the mechanical properties and hydrolysis resistance of the product is enhanced. Moreover, the monomer is introduced into the nanometer clay to provide a composite as a factor for controlling the physical properties of the polymer.

Figure 6:
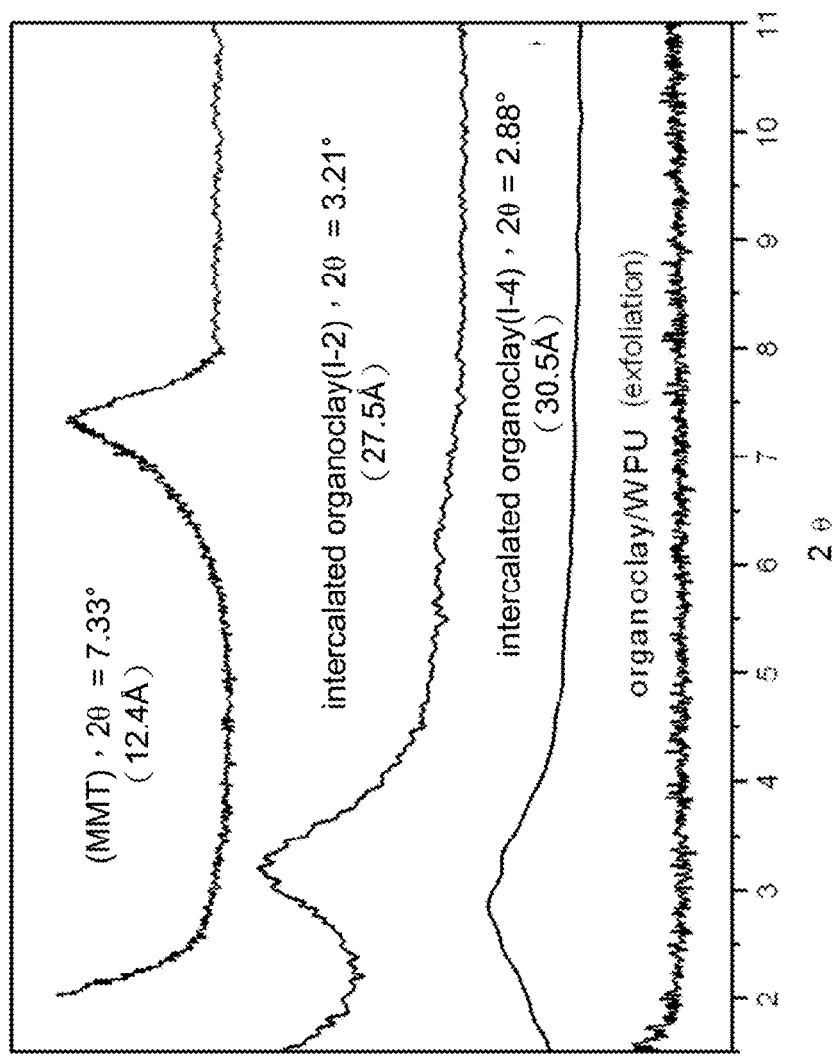
FIG. 6 is a XRD patterns of pristine clay and organoclays.

Referring to FIG. 6, the results of the de-lamination after the in-situ polymerization are shown. The compositions and the physical properties of the films are also listed in Table 3.

Figure 7:
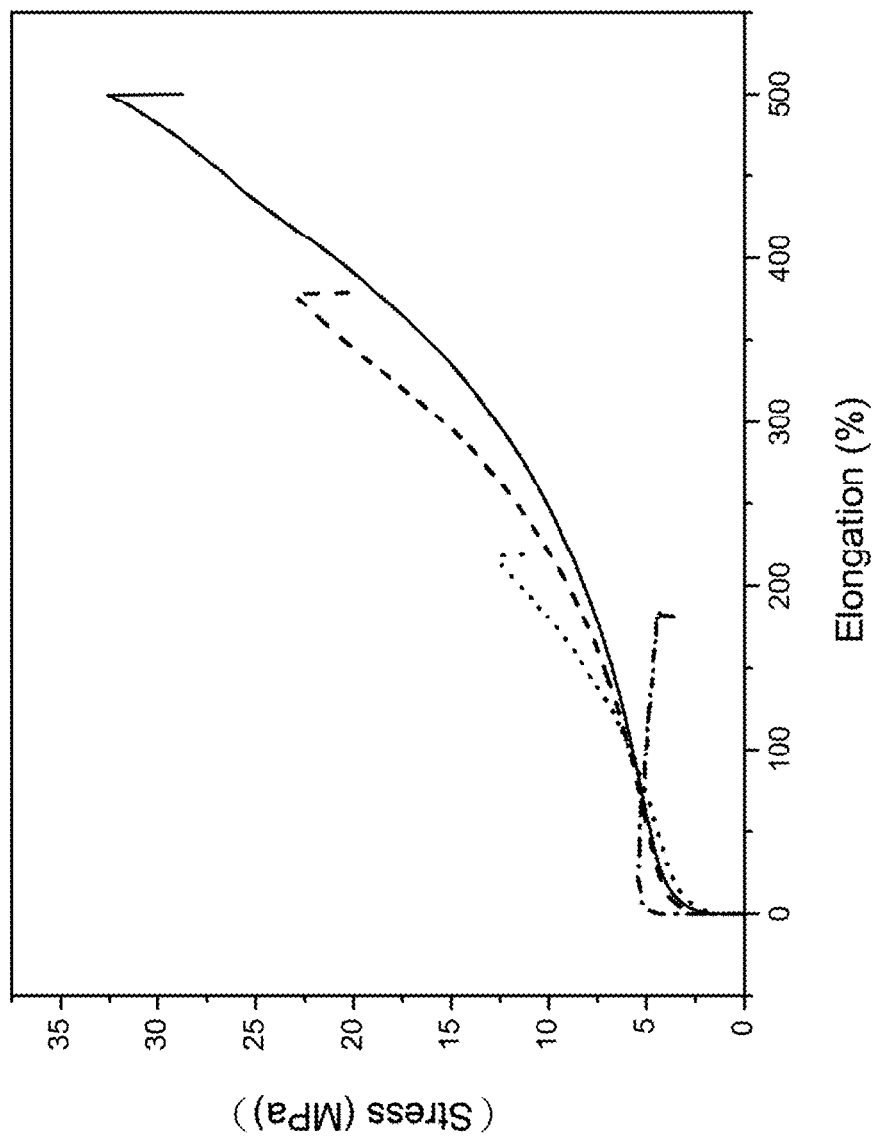
FIG. 7 is a tensile test of waterborne polyurethane/clay nanocomposite.

Referring to FIG. 7, tests are run on the tensile strength of the clay composite. It is observed that the extension of the dry polyurethane film is reduced and the fracture is moved toward the left as the clay is introduced. That is, the mechanical properties of the film are improved. A straight line is used to represent the waterborne polyurethane, and a phantom line is used to represent waterborne polyurethane/1 wt % clay, and a dotted line is used to represent the waterborne polyurethane/3 wt % clay, and a chain line is used to represent the waterborne polyurethane/5 wt % clay. In Table 3, the NMP (10 wt % to 15 wt %) is used as the cosolvent, and the final concentration of solid is 30 wt %, and the MDI/(MDI+IPDI) molecular proportion is 35% to 40%.

TABLE 3

| | Composition (Molecular Proportion) | | | | | | | |
|---|---|---|---|---|---|---|---|---|
| | Organic Modified Clay | | | | | | | |
| No. | clay (Weight Proportion) | Compound I-2 | EDA | MDI | IPDI | RS-956 | DMPA | TEA | Size (nm) |
| D0 | 0 | 0 | 1.60 | 1.28 | 2.32 | 1 | 1 | 1 | 68 |
| D1 | 1 | 0.03 | 1.59 | 1.28 | 2.32 | 1 | 1 | 1 | 90 |
| D3 | 3 | 0.08 | 1.56 | 1.28 | 2.32 | 1 | 1 | 1 | 133 |
| D5 | 5 | 0.14 | 1.61 | 1.28 | 2.32 | 1 | 1 | 1 | 203 |

| No. | Yield Stress (MPa) | Tensile Strength (MPa) | 100% Modulus (MPa) | Extension (%) |
|---|---|---|---|---|
| D0 | 4.0 | 28 | 5.9 | 447 |
| D1 | 4.1 | 23 | 5.7 | 378 |
| D3 | 3.4 | 13 | 5.9 | 217 |
| D5 | 5.3 | 4.5 | 5.1 | 183 |

As discussed above, the waterborne polyurethane with the reactive side-chain group and the nanometer clay composite of the present invention can be used in the auto industry such as in synthetic leather and fabrics and on plastics and metal. The waterborne polyurethane and the nanometer clay composite can be used in building materials such as furniture, walls, adhesion and paint. The multi-functional diols with reactive azetidine-2,4-dione functional group could be embedded into waterborne polyurethane structure, serving as chain-extender, hard segment of polyurethane, crosslinking sites, and reactive modifier of montmorillonite. Thus, the molecular weight and physical properties of the waterborne polyurethane are improved, and the chemical resistance, thermo-tolerance, hydrolysis resistance, wear-resistance and mechanical properties of the film are considerably enhanced.

The present invention has been described via the detailed illustration of the preferred embodiment. Those skilled in the art can derive variations from the preferred embodiment without departing from the scope of the present invention. Therefore, the preferred embodiment shall not limit the scope of the present invention defined in the claims.

The invention claimed is:

1. A process for forming an aqueous polyurethane dispersion and/or a polyurethane/clay nanocomposite dispersion, the process comprising: providing an isocyanate (NCO)-terminated prepolymer with a side-chain reactive functional group by admixing (i) at least one diisocyanate, (ii) at least one difunctional polyol, (iii) a short-chain diol monomer having a side-chain reactive functional group or a modified clay thereof, (iv) at least one hydroxy carboxylic acid compound and (v) a hydrophilic cosolvent; neutralizing the NCO-terminated prepolymer with a tertiary amine, wherein component (ii) is different from component (iii) and wherein component (ii) is different from component (iv); dispersing the NCO-terminated prepolymer in water; and admixing the NCO-terminated prepolymer with at least one chain extending agent comprising a hydrophilic diamine; wherein the short-chain diol monomer (iii) is expressed by structural formula (I):

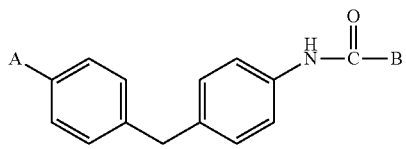
(I)

wherein, A is an azetidine-2,4-dione functional group

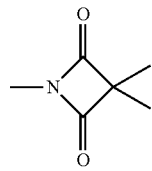

or a malonamide-linked alkyl group

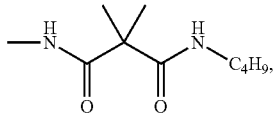

and B is a nitrogen-linked di-hydroxy terminal group

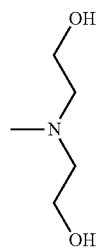

or tertiary amine-linked di-hydroxy terminal group

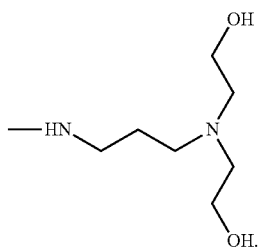

2. The method according to claim 1, wherein the compound of structural formula (I) is a short-chain diol with a pendent azetidine-2,4-dione functional group, wherein A is

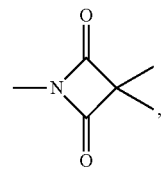

and B is

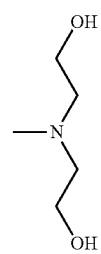

or

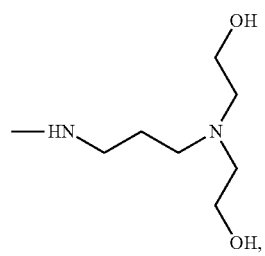

wherein the short-chain diol monomer (iii) was synthesized by reacting IDD[4-isocyanato-4'(3,3-dimethyl-2,4-dioxo-azetiddino)diphenylmethane] with diethanolamine or N-(3-aminopropyl)diethanolamine.

3. The method according to claim 1, wherein the compound of structural formula (I) is a short-chain diol with a pendent malonamide-linked alkyl group, wherein A is

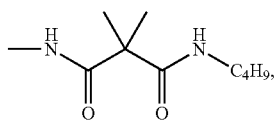

and B is

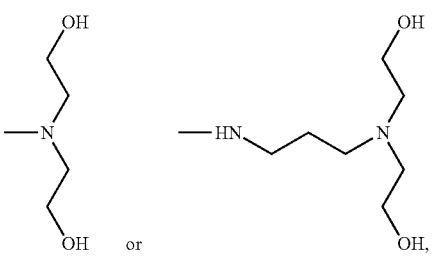

wherein the short-chain diol monomer (iii) was synthesized by reacting IDD[4-isocyanato-4'(3,3-dimethyl-2,4-dioxoazetiddino)diphenylmethane] with diethanolamine or N-(3-aminopropyl)diethanolamine, and then reacting with n-butyl amine.

4. The method according to claim 1, wherein the modified clay thereof is produced by acidifying the compound of structural formula (I) with an inorganic acid, and admixing a clay with the acidified short chain diol monomer of structural formula (I), wherein the compound of structural formula (I) serves as a layered clay intercalating agent, wherein the compound of structural formula (I) is a short-chain diol with a pendent tertiary amine-linked di-hydroxy terminal group; wherein A is

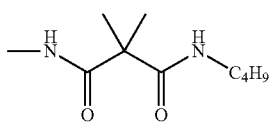

and B is

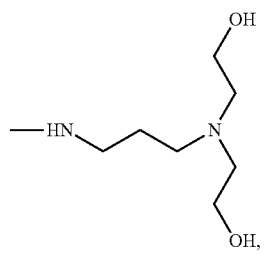

wherein the short-chain diol monomer (iii) was synthesized by reacting IDD [4-isocyanato-4'(3,3-dimethyl-2,4-dioxoazetiddino)diphenylmethane] with N-(3-aminopropyl)diethanolamine, and then reacting with n-butyl amine, producing a clay/polyurethane nanocomposite dispersion.

5. The method according to claim 4, wherein the compound of formula (I) acts to increase the gallery between two adjacent layers of the clay to increase the organic compatibility so that the gallery is 25.5 to 30.5 Å.

6. The method according to claim 4, wherein the clay has a cation exchange capacity between 50 and 200 meq/100 g.

7. The method according to claim 4, wherein the clay is selected from the group consisting of smectite clay, vermiculite, halloysite, sericite, saponite and mica.

8. The process of claim 1 wherein the (iv) at least one hydroxy carboxylic acid compound is selected from the group consisting of dimethylolpropionic acid (DMPA), dimethylol butanioc acid (DMBA), and mixtures thereof.

9. The method according to claim 1, wherein the diisocyanate is 100% aliphatic isocyanate, or a mixture of aliphatic and aromatic isocyanate.

10. The method according to claim 9, wherein the concentration of the aromatic isocyanate is 10 mol% to 40 mol% with respect to the total moles of isocyanate in the mixture of aliphatic and aromatic isocyanate.

11. The method according to claim 6, wherein the aliphatic isocyanate is chosen from hexamethylene diisocyanate, bis(cyclohexyl)methylene diisocyanate, or isophorone diisocyanate, and wherein the aromatic isocyanate is toluene di-isocyanate or methylene di-p-phenyl diisocyanate.

12. The method according to claim 1, wherein the (ii) at least one difunctional polyol is chosen from polyether polyol or polyester polyol.

13. The method according to claim 12, wherein the molecular weight of the polyol is 800 to 2500.

14. The method according to claim 12, wherein the polyether polyol is chosen from polyether polypropyl glycol or polytetramethylene ether glycol, and wherein the polyester polyol is chosen from polycaprolactone glycol, polyhexanediol-co-adipate glycol and polybutanediol-co-adipate glycol.

15. The method according to claim 1, wherein the (v) hydrophilic cosolvent is chosen from acetone, methyl ethyl ketone, N-methyl-2-pyrrolidone and N,N-dimethylformamide.

16. The method according to claim 1, wherein the hydrophilic di-amine chain extending agent is chosen from ethylene diamine, butylene diamine, hexylene diamine and isophorone diamine.

* * * * *